US012693697B2

(12) United States Patent
Inoue et al.

(10) Patent No.: US 12,693,697 B2
(45) Date of Patent: Jul. 28, 2026

(54) LINEAR POWER SUPPLY DEVICE AND POWER SUPPLY SYSTEM

(71) Applicant: ROHM CO., LTD., Kyoto (JP)

(72) Inventors: Hiroki Inoue, Kyoto (JP); Atsuhiro Watanabe, Kyoto (JP); Isamu Iwahashi, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 108 days.

(21) Appl. No.: 18/769,545

(22) Filed: Jul. 11, 2024

(65) Prior Publication Data

US 2024/0370046 A1 Nov. 7, 2024

Related U.S. Application Data

(63) Continuation of application No. PCT/JP2022/048559, filed on Dec. 28, 2022.

(30) Foreign Application Priority Data

Jan. 19, 2022 (JP) ................................ 2022-006123
Jul. 6, 2022 (JP) ................................ 2022-108824

(51) Int. Cl.
*G05F 1/575* (2006.01)
*G05F 1/56* (2006.01)
(Continued)

(52) U.S. Cl.
CPC .............. *G05F 1/575* (2013.01); *G05F 1/561* (2013.01); *G05F 1/59* (2013.01); *G05F 3/262* (2013.01)

(58) Field of Classification Search
CPC . G05F 1/575; G05F 1/561; G05F 1/59; G05F 3/262
See application file for complete search history.

(56) References Cited

U.S. PATENT DOCUMENTS

2011/0291626 A1* 12/2011 Murakami ............ H02M 3/156 323/271
2013/0308061 A1* 11/2013 Murakami .......... H02M 3/1582 348/730

(Continued)

FOREIGN PATENT DOCUMENTS

JP 2020-004214 1/2020

OTHER PUBLICATIONS

International Search Report and Written Opinion in International Appln. No. PCT/JP2022/048559, mailed on Mar. 14, 2023, 13 pages (with machine translation).

*Primary Examiner* — Rafael O De Leon Domenech
(74) *Attorney, Agent, or Firm* — Fish & Richardson P.C.

(57) ABSTRACT

A linear power supply device includes a first mirror transistor configured to be capable of generating a first mirror current; a second mirror transistor configured to be capable of generating a second mirror current; a switch circuit that switches between outputting the first mirror current from a current transmission/reception terminal to outside, and receiving external mirror current from outside through the current transmission/reception terminal, on the basis of a switching signal; and a comparison unit that compares the external mirror current with the second mirror current, and draws out current from a second node connected to a first feedback resistor and a second feedback resistor, or injects current into the second node, on the basis of the comparison result.

12 Claims, 10 Drawing Sheets

(51) Int. Cl.
*G05F 1/59* (2006.01)
*G05F 3/26* (2006.01)

(56) References Cited

U.S. PATENT DOCUMENTS

| | | | | |
|---|---|---|---|---|
| 2013/0314606 | A1* | 11/2013 | Murakami | H04N 5/63 348/730 |
| 2016/0028311 | A1* | 1/2016 | Murakami | H02M 3/1588 323/271 |
| 2016/0301309 | A1* | 10/2016 | Tateishi | H02M 1/08 |

* cited by examiner

LINEAR POWER SUPPLY DEVICE AND POWER SUPPLY SYSTEM

CROSS-REFERENCE TO RELATED APPLICATIONS

This nonprovisional application is a continuation application of International Patent Application No. PCT/JP2022/048559 filed on Dec. 28, 2022, which claims priority to Japanese Patent Application No. 2022-006123 filed on Jan. 19, 2022 and Japanese Patent Application No. 2022-108824 filed on Jul. 6, 2022, the entire contents of which are hereby incorporated by reference.

TECHNICAL FIELD

The present disclosure relates to a linear power supply device and a power supply system.

BACKGROUND ART

Conventionally, a linear power supply device (linear regulator), which can generate a desired output voltage from an input voltage, is mounted in various applications (in-vehicle equipment, industrial equipment, office equipment, digital home appliances, portable equipment, and the like).

There is a linear power supply device that uses two linear power supply devices, whose output terminal outputting output voltages of the linear power supply devices, respectively, are connected to a common load (see, for example, Patent Document 1). In other words, these linear power supply devices are connected in parallel to the common load. This linear power supply device is used for a purpose of dividing load current into output currents output from the output terminal so as to disperse heat, or increasing the load current based on the output currents output from the individual output terminals.

LIST OF CITATIONS

Patent Literature

Patent Document 1: JP-A-2020-4214

DESCRIPTION OF EMBODIMENTS

1. Comparative Example

Here, before description of a new embodiment of a linear power supply device, a comparative example to be compared with the embodiment is described.

Figure 1:
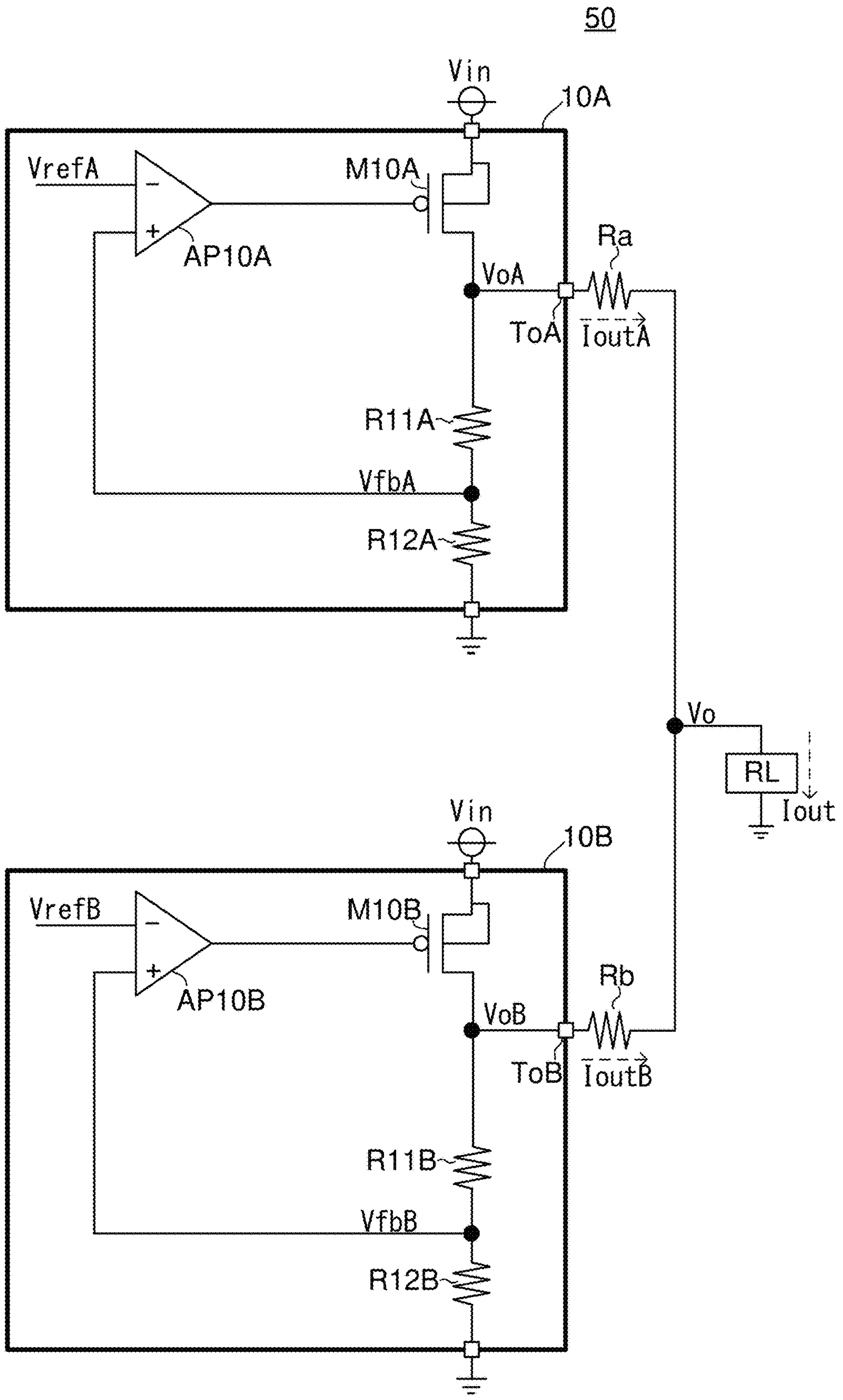
FIG. 1 is a diagram illustrating a structure of a power supply system according to a comparative example.

FIG. 1 is a diagram illustrating a structure of a power supply system 50 according to the comparative example. The power supply system 50 includes a linear power supply device 10A, a linear power supply device 10B, and resistors Ra and Rb. The power supply system 50 uses the two linear power supply devices 10A and 10B so as to supply a load current Iout to a load RL.

The linear power supply devices 10A and 10B are linear regulators, which step down an input voltage Vin so as to generate desired output voltages VoA and VoB, respectively. Note that the linear power supply device 10A and the linear power supply device 10B are integrated circuits (ICs) having the same structure, in which corresponding components are denoted by the same symbol plus suffix "A" or "B". In the following description, a structure of the linear power supply device 10A is typically described.

As illustrated in FIG. 1, the linear power supply device 10A is an IC including an output transistor M10A, resistors R11A and R12A, and an error amplifier AP10A, which are integrated in a single chip.

A source of the output transistor M10A, which is constituted as a PMOS transistor (a P-channel metal-oxide-semiconductor field-effect transistor (MOSFET)), is connected to an input terminal of the input voltage Vin. A drain of the output transistor M10A and a first terminal of the resistor R11A are commonly connected to an output terminal ToA to output the output voltage VoA. A second terminal of the resistor R11A is connected to a first terminal of the resistor R12A. A second terminal of the resistor R12A is connected to a ground terminal. A noninverting input terminal (+) of the error amplifier AP10A is connected to a connection node at which the resistors R11A and R12A are connected (i.e., an application terminal of a feedback voltage VfbA). An inverting input terminal (−) of the error amplifier AP10A is connected to an application terminal of a reference voltage VrefA. An output terminal of the error amplifier AP10A is connected to a gate of the output transistor M10A.

The error amplifier AP10A described above performs gate control of the output transistor M10A, so that the feedback voltage VfbA corresponding to the output voltage VoA ($VfbA=VoA\times(R12A/(R11A+R12A))$) is equal to the predetermined reference voltage VrefA. In other words, the on-resistance value of the output transistor M10A is continuously controlled, so that the output voltage VoA is equal to its target value ($=VrefA\times((R11A+R12A)/R12A)$).

Similarly, in the linear power supply device 10B, the on-resistance value of an output transistor M10B is continuously controlled, so that the output voltage VoB is equal to its target value.

The output terminal ToA is connected to a first terminal of the resistor Ra disposed outside the linear power supply devices 10A and 10B. An output terminal ToB is connected to a first terminal of the resistor Rb disposed outside the linear power supply devices 10A and 10B. Second terminals of the resistors Ra and Rb are commonly connected to the load RL. Therefore, the linear power supply devices 10A and 10B are connected in parallel to the common load RL.

Here, standard values (typical values) of the output voltages VoA and VoB of the linear power supply devices 10A and 10B are set to the same value, but the output voltages may be varied from the standard value due to variations of the linear power supply devices. For instance, they may be varied within the range of ±2% of the standard value 5 V. This variation is generated due to, for example, a variation of the reference voltage, the feedback voltage, or a threshold value voltage of the output transistor, or a variation of an input offset voltage of the error amplifier, or the like.

Suppose a structure in which the output terminals ToA and ToB are directly connected. In this case, if the output voltage VoA is higher than the output voltage VoB, for example, the output transistor M10B of the linear power supply device 10B side is maintained to be off, an output current IoutB is not output from the output terminal ToB, and the load current Iout is supplied only from an output current IoutA output from the output terminal ToA of the linear power supply device 10A. Therefore, the output current is concentrated on one of the linear power supply devices.

In contrast, in the structure of the comparative example illustrated in FIG. 1, if the output voltage VoA is higher than the output voltage VoB, for example, when the load current Iout gradually increases from 0 A, the output voltage VoA is decreased due to a voltage drop by the resistor Ra, and an output voltage Vo generated at a node at which second terminal of the resistors Ra and Rb are connected is gradually decreased. Further, when the output voltage Vo reaches the output voltage VoB, the output transistor M10B of the linear power supply device 10B side starts to work, and the output terminal ToB starts to output the output current IoutB. In other words, parallel operation starts in which both the output currents IoutA and IoutB supply the load current Iout. Note that the resistors Ra and Rb should be set to have resistance values such that the voltage drop by the resistor is more than or equal to a voltage difference between a maximum value and a minimum value, due to variations of the output voltages.

In this way, with the structure of the comparative example, even if the output voltages have variations in the case where the two linear power supply devices are used in parallel connection, the parallel operation can be performed. However, this comparative example has a problem that loss and heat are generated by the resistors Ra and Rb, and that the output currents IoutA and IoutB are not equalized. In addition, if the load current Iout changes, the output voltage Vo is changed due to voltage drops by the resistors Ra and Rb, and hence a function as a regulator has a problem.

2. First Embodiment

Figure 2:
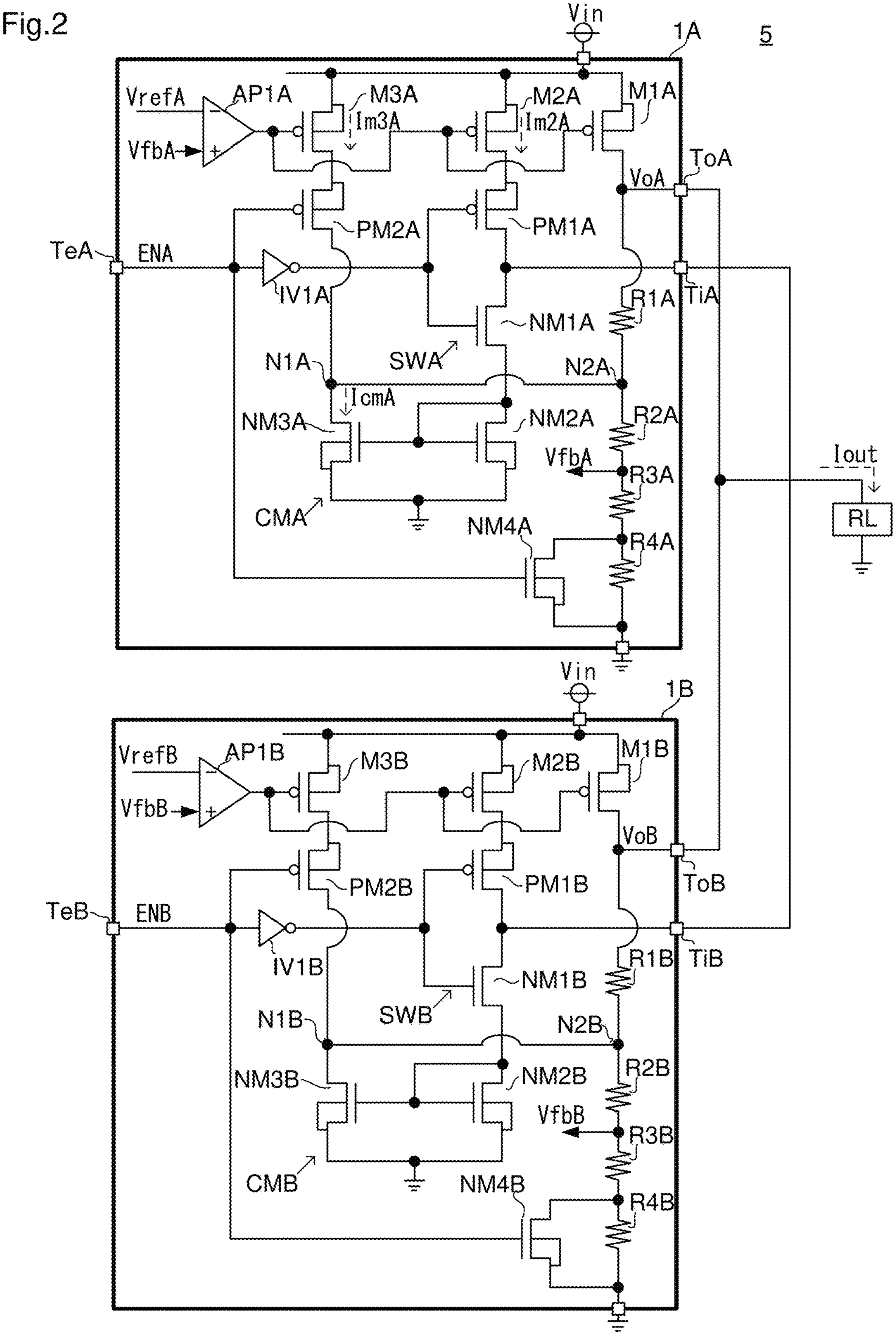
FIG. 2 is a diagram illustrating a structure of the power supply system according to a first embodiment.

In the following description, individual embodiments that can solve the above problem are described. FIG. 2 is a diagram illustrating a structure of a power supply system 5 according to the first embodiment. The power supply system 5 includes a linear power supply device 1A and a linear power supply device 1B. The power supply system 5 uses the two linear power supply devices 1A and 1B so as to supply the load current Iout to the load RL.

The linear power supply devices 1A and 1B are linear regulators that step down the input voltage Vin to generate the desired output voltages VoA and VoB, respectively. Note that the linear power supply device 1A and the linear power supply device 1B are ICs having the same structure, in which corresponding components are denoted by the same symbol plus suffix "A" or "B". In the following description, a structure of the linear power supply device 1A is typically described.

As illustrated in FIG. 2, the linear power supply device 1A is an IC including an output transistor M1A, mirror transistors M2A and M3A, PMOS transistors PM1A and PM2A, NMOS transistors (N-channel MOSFETs) NM1A, NM2A, NM3A, and NM4A, feedback resistors R1A, R2A, R3A, and R4A, an error amplifier AP1A, and an inverter IV1A, which are integrated in a single chip. In addition, the linear power supply device 1A has external terminals such as the output terminal ToA, a current transmission/reception terminal TiA, and an enable terminal TeA, so as to establish electric connection with the outside.

A source of the output transistor M1A constituted as a PMOS transistor is connected to an application terminal of the input voltage Vin. A drain of the output transistor MIA is connected to a first terminal of the feedback resistor R1A. A second terminal of the feedback resistor R1A is connected to a first terminal of the feedback resistor R2A. A second terminal of the feedback resistor R2A is connected to a first terminal of the feedback resistor R3A. A second terminal of the feedback resistor R3A is connected to a first terminal of the feedback resistor R4A. A second terminal of the feedback resistor R4A is connected to the ground terminal.

A noninverting input terminal (+) of the error amplifier AP1A is connected to a connection node at which the resistors R2A and R3A are connected (i.e., an application terminal of the feedback voltage VfbA). An inverting input terminal (−) of the error amplifier AP1A is connected to an application terminal of the reference voltage VrefA. An output terminal of the error amplifier AP1A is connected to a gate of the output transistor MIA.

A drain of the NMOS transistor NM4A is connected to a first terminal of the feedback resistor R4A. A source of the NMOS transistor NM4A is connected to the second terminal of the feedback resistor R4A. A gate of the NMOS transistor NM4A is connected to the enable terminal TeA. In this way, ON state and OFF state of the NMOS transistor NM4A is switched in accordance with an enable signal ENA input to the enable terminal TeA (described later in detail). If the NMOS transistor NM4A is ON state, both ends of the feedback resistor R4A are short-circuited, and the feedback resistor R4A is bypassed. On the other hand, if the NMOS transistor NM4A is OFF state, the feedback resistor R4A is valid. In other words, the NMOS transistor NM4A works as a bypass switch that switches whether or not to bypass the feedback resistor R4A.

If the feedback resistor R4A is bypassed, the error amplifier AP1A described above performs gate control of the output transistor MIA, so that the feedback voltage VfbA corresponding to the output voltage VoA (VfbA=VoA×(R3A/(R1A+R2A+R3A))) is equal to the predetermined reference voltage VrefA. In other words, the on-resistance value of the output transistor MIA is continuously controlled, so that the output voltage VoA is equal to its target value (=VrefA×((R1A+R2A+R3A)/(R3A))).

If the feedback resistor R4A is not bypassed, the error amplifier AP1A described above performs the gate control of the output transistor MIA, so that the feedback voltage VfbA corresponding to the output voltage VoA (VfbA=VoA×((R3A+R4A)/(R1A+R2A+R3A+R4A))) is equal to the predetermined reference voltage VrefA. In other words, the on-resistance value of the output transistor M1A is continuously controlled, so that the output voltage VoA is equal to its target value (=VrefA×((R1A+R2A+R3A+R4A)/(R3A+R4A))).

A source of the mirror transistor M2A constituted as a PMOS transistor is connected to an application terminal of the input voltage Vin. A drain of the mirror transistor M2A is connected to a source of the PMOS transistor PM1A. A drain of the PMOS transistor PM1A is connected to a drain of the NMOS transistor NM1A. A node at which a drain of the PMOS transistor PM1A and a drain of the NMOS transistor NM1A are connected is connected to the current transmission/reception terminal TiA. A gate of the PMOS transistor PM1A and a gate of the NMOS transistor NM1A are connected to an output terminal of the inverter IV1A. An input terminal of the inverter IV1A is connected to the enable terminal TeA. A gate of the mirror transistor M2A is connected to an output terminal of the error amplifier AP1A.

If the enable signal ENA is high level, the PMOS transistor PM1A is ON state, and the NMOS transistor NM1A is OFF state. In this case, the mirror current of the current flowing in the output transistor M1A flows in the mirror transistor M2A. The mirror current described above is a fraction of one hundredth or a fraction of one thousandth of the current flowing in the output transistor M1A, for example. The mirror current described above flows in the PMOS transistor PM1A in ON state and is output to the outside through the current transmission/reception terminal TiA.

On the other hand, if the enable signal ENA is low level, the PMOS transistor PM1A is OFF state, and the NMOS transistor NM1A is ON state. In this case, the mirror current is not output from the current transmission/reception terminal TiA, and the mirror current input from the outside through the current transmission/reception terminal TiA flows in the NMOS transistor NM1A in ON state, and is input to a current mirror circuit CMA described later. In other words, a switch circuit SWA constituted of the PMOS transistor PM1A and the NMOS transistor NM1A switches between allowing the mirror current to be output to the outside from the current transmission/reception terminal TiA, and allowing the mirror current that is input from the outside through the current transmission/reception terminal TiA to be input to the current mirror circuit CMA.

The current mirror circuit CMA includes the NMOS transistor NM2A on the input side, and the NMOS transistor NM3A on the output side. A drain and a gate of the NMOS transistor NM2A are short-circuited. A drain of the NMOS transistor NM2A is connected to a source of the NMOS transistor NM1A. The gate of the NMOS transistor NM2A and a gate of the NMOS transistor NM3A are connected to each other. A source of the NMOS transistor NM2A and a source of the NMOS transistor NM3A are commonly connected to the ground terminal.

A source of the mirror transistor M3A constituted as a PMOS transistor is connected to an application terminal of the input voltage Vin. A drain of the mirror transistor M3A is connected to a source of the PMOS transistor PM2A. A drain of the PMOS transistor PM2A is connected to a drain of the NMOS transistor NM3A. A gate of the PMOS transistor PM2A is connected to the enable terminal TeA. A gate of the mirror transistor M3A is connected to the output terminal of the error amplifier AP1A.

If the enable signal ENA is high level, the PMOS transistor PM2A is OFF state, and a mirror current Im3A of the current flowing in the output transistor M1A does not flow in the mirror transistor M3A. On the other hand, if the enable signal ENA is low level, the PMOS transistor PM2A is ON state, and the mirror current Im3A of the current flowing in the output transistor M1A flows in the mirror transistor M3A. The mirror current Im3A is a fraction of one hundredth or a fraction of one thousandth of the current flowing in the output transistor M1A, for example. The mirror current Im3A flows in the PMOS transistor PM2A in ON state, and flows into a node N1A at which the PMOS transistor PM2A and the NMOS transistor NM3A are connected.

A current IcmA mirrored and output by the current mirror circuit CMA is compared with the mirror current Im3A at the node N1A. If the current IcmA is more than the mirror current Im3A, current is drawn out from a node N2A, at which the resistor R1A and the resistor R2A are connected, to the node N1A side. On the other hand, if the current IcmA is less than the mirror current Im3A, current is injected into the node N2A. In accordance with drawing out or injecting of current from or into the node N2A, the feedback voltage VfbA is adjusted, and the output voltage VoA is controlled.

The output terminal ToA of the linear power supply device 1A and the output terminal ToB of the linear power supply device 1B are commonly connected to the load RL. In other words, the linear power supply devices 1A and 1B are connected in parallel to the common load RL. In addition, for transmission and reception of the mirror current, the current transmission/reception terminal TiA of the linear power supply device 1A and a current transmission/reception terminal TiB of the linear power supply device 1B are connected to each other.

Next, an operation of the power supply system 5 is described with reference to FIG. 3. One of the linear power supply devices 1A and 1B is set as a master, and the other is set as a slave. Setting of master or slave is performed by the enable signals ENA and ENB. In the case of master, the enable signal ENA, ENB is high level. In the case of slave, the enable signal ENA, ENB is low level.

Figure 3:
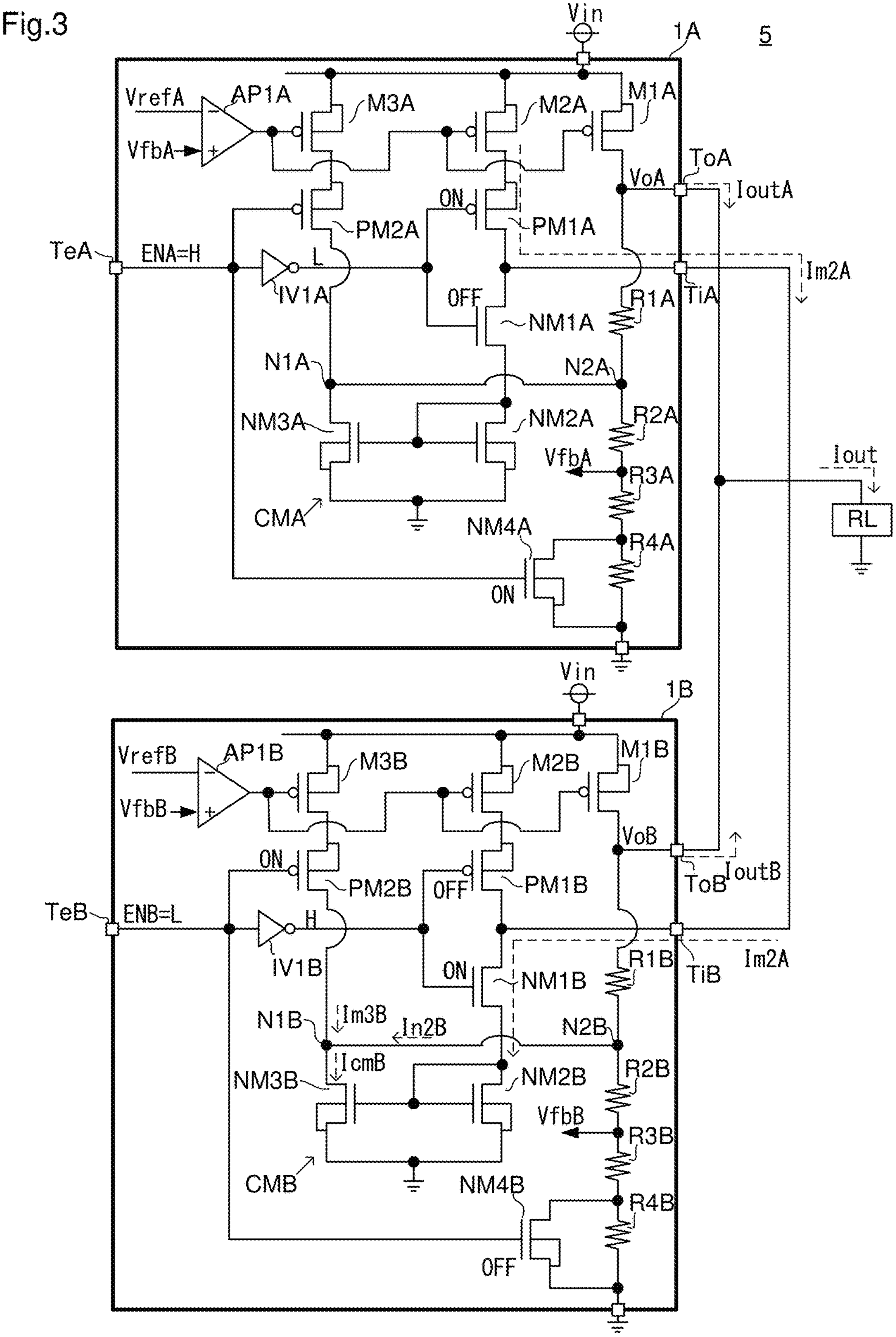
FIG. 3 is a diagram illustrating an operation example of the power supply system according to the first embodiment.

In the example of FIG. 3. the enable signal ENA is high level while the enable signal ENB is low level, and hence the linear power supply device 1A is set to master while the linear power supply device 1B is set to slave.

In this way, the NMOS transistor NM4A in the linear power supply device 1A is ON state, and an NMOS transistor NM4B in the linear power supply device 1B is OFF state. Therefore, the feedback resistor R4A is bypassed, while a feedback resistor R4B is not bypassed. As the feedback resistor R4B is not bypassed, the output voltage VoB is controlled to a lower target value than in the case of being bypassed. The feedback resistors R4A and R4B should be set to have resistance values such that the voltage drop is more than or equal to a voltage difference between a maximum value and a minimum value, due to variations of the output voltages. In this way, even if the output voltages VoA and VoB have variations, the output voltage VoB can be set lower than the output voltage VoA.

Figure 4:
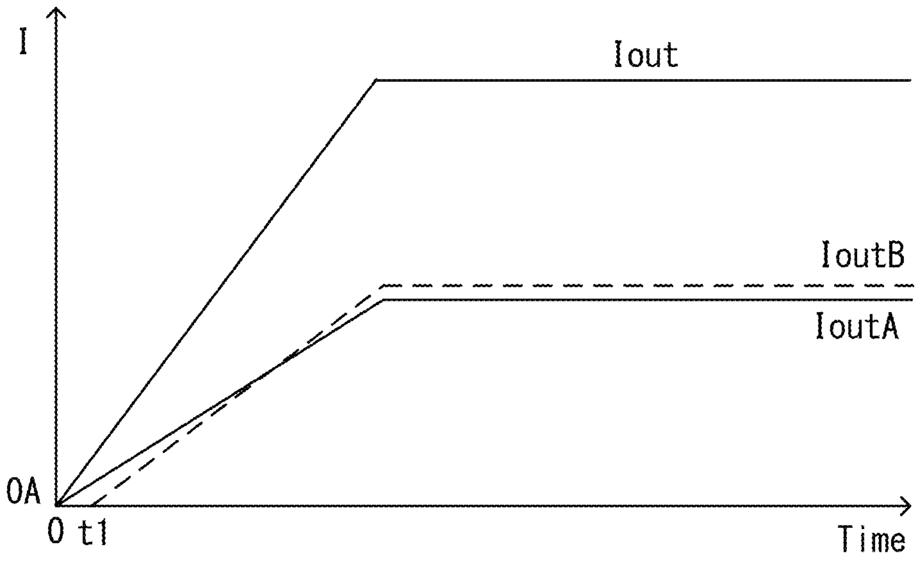
FIG. 4 is a diagram illustrating a waveform example of an output current and a load current.

In this way, as illustrated in FIG. 4, even if the load current Iout starts to flow from 0 A, the output current IoutB is not output from the output terminal ToB of the linear power supply device 1B, and only the output current IoutA output from the output terminal ToA of the linear power supply device 1A supplies the load current Iout.

In this case, as illustrated in FIG. 3, in the linear power supply device 1A, the PMOS transistor PM1A is ON state while the NMOS transistor NM1A is OFF state, and hence the mirror transistor M2A outputs a mirror current Im2A from the current transmission/reception terminal TiA to the outside. On the other hand, in the linear power supply device 1B, a PMOS transistor PM1B is OFF state while an NMOS transistor NM1B is ON state, and hence the mirror current Im2A flows from the outside through the current transmission/reception terminal TiB to the NMOS transistor NM1B.

The mirror current Im2A flowing in an NMOS transistor NM2B on the input side is mirrored by a current mirror circuit CMB to be a current IcmB flowing in a NMOS transistor NM3B on the output side. Here, although a PMOS transistor PM2B is ON state, a mirror current Im3B by a mirror transistor M3B does not flow, and hence a difference current In2B is drawn out from a node N2B to a node N1B side. Therefore, a feedback voltage VfbB is adjusted, and the output voltage VoB is increased.

As the load current Iout increases, and the output current IoutA as well as the mirror current Im2A increases, the difference current In2B increases, and the output voltage VoB increases. Further, when the output voltage VoB reaches the output voltage VoA, the output current IoutB starts to be output from the output terminal ToB of the linear power supply device 1B (timing t1 in FIG. 4). In other words, parallel operation of the linear power supply devices 1A and 1B is started.

As the output current IoutB starts to flow, the mirror current Im3B also starts to flow, and the difference current In2B is drawn out or injected on the basis of a level relationship between the current IcmB and the mirror current Im3B. Therefore, the feedback voltage VfbB is adjusted, and the output current IoutB is controlled to be close to IoutA. As illustrated in FIG. 4, when the load current Iout is saturated, the output currents IoutA and IoutB are also saturated. Note that in FIG. 4, the output currents IoutA and IoutB are not the same when being saturated, but it is also possible to match the output currents IoutA and IoutB when being saturated, depending on accuracy of the current mirror circuit CMB, offset of an error amplifier AP1B, and the like.

In this way, information of the mirror current is output from the master side to the outside, and the slave side receives this mirror current information. In the slave side, mirror current information of the current flowing in its output transistor is compared with the received mirror current information using the current mirror circuit, and the difference current as the comparison result is drawn out or injected, so as to correct the output voltage.

In this way, even if the output voltages of the linear power supply devices 1A and 1B have variations, the parallel operation can be performed, so that the output currents can be close to equal to each other. In addition, variations of the output voltages with respect to a variation of the load current can be suppressed. Further, the resistors for voltage drop in the comparative example described above are not necessary, and hence loss and heat can be suppressed. In addition, this effect can be realized by the linear power supply devices of the same product number.

Note that the linear power supply device 1A, 1B can be used solely by setting the enable signal ENA, ENB to high level. However, it may be possible to provide the linear power supply device with a logic structure that sets the linear power supply device to master by setting the enable signal ENA, ENB to low level. In this case, the linear power supply device can be used solely by setting the enable signal ENA, ENB to low level.

3. Second Embodiment

Figure 5:
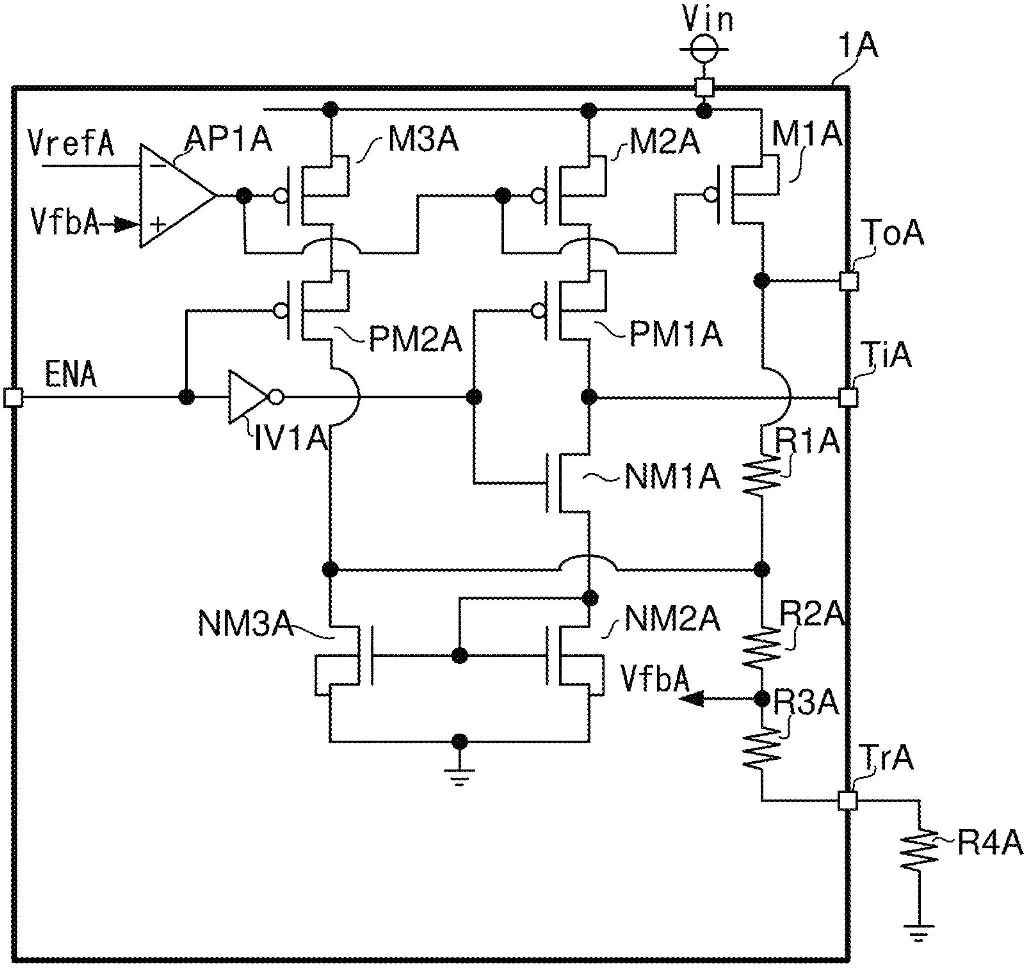
FIG. 5 is a diagram illustrating a structure of a linear power supply device according to a second embodiment.

FIG. 5 is a diagram illustrating a structure of the linear power supply device 1A according to the second embodiment. All the feedback resistors are embedded in the IC in the first embodiment (FIG. 2), and the second embodiment is a variation of the first embodiment concerning the feedback resistor.

The linear power supply device 1A illustrated in FIG. 5 is different from the first embodiment (FIG. 2) in that a terminal TrA for resistor. The second terminal of the feedback resistor R3A is connected to the terminal TrA for resistor. The terminal TrA for resistor is connected to a first terminal of the feedback resistor R4A disposed outside the linear power supply device 1A. In other words, in this embodiment, the feedback resistor R4A can be externally disposed.

In this way, when setting the linear power supply device to slave, the feedback resistor R4A is connected to the terminal Tr for resistor, while when setting the linear power supply device to master, the terminal Tr for resistor is connected to the ground terminal. Therefore, in this embodiment, the NMOS transistor NM4B for bypass is not necessary.

Note that it may be possible that the feedback resistors R1A, R2A, R3A, and R4A can be disposed externally to the linear power supply device, for example.

4. Third Embodiment

Figure 6:
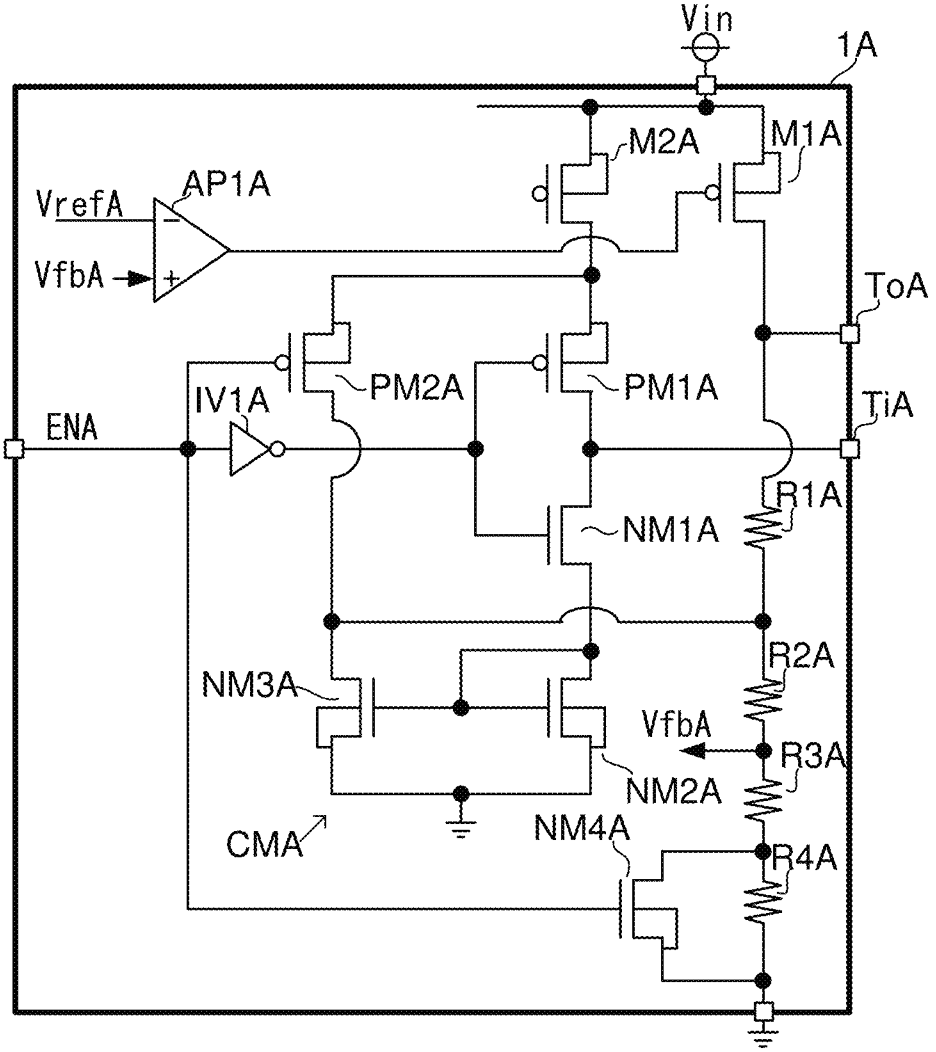
FIG. 6 is a diagram illustrating a structure of the linear power supply device according to a third embodiment.

FIG. 6 is a diagram illustrating a structure of the linear power supply device 1A according to the third embodiment. The structure illustrated in FIG. 6 is different from the first embodiment (FIG. 2) in that the mirror transistors M2A and M3A are integrated into the mirror transistor M2A. In other words, in the structure illustrated in FIG. 6, the drain of the mirror transistor M2A is connected to the sources of the PMOS transistors PM1A and PM2A.

With this structure, if the linear power supply device 1A is set to master, the mirror current flowing in the mirror transistor M2A is output to the outside through the PMOS transistor PM1A and the current transmission/reception terminal TiA. In addition, if the linear power supply device 1A is set to slave, the mirror current flowing in the mirror transistor M2A flows to the current mirror circuit CMA side through the PMOS transistor PM2A. According to this embodiment, the number of components can be reduced.

Note that, in the case where two mirror transistors are disposed as in the first embodiment or the like, the mirror ratios can be set individually, and hence the output currents IoutA and IoutB can be intentionally shifted from the same value.

5. Fourth Embodiment

Figure 7:
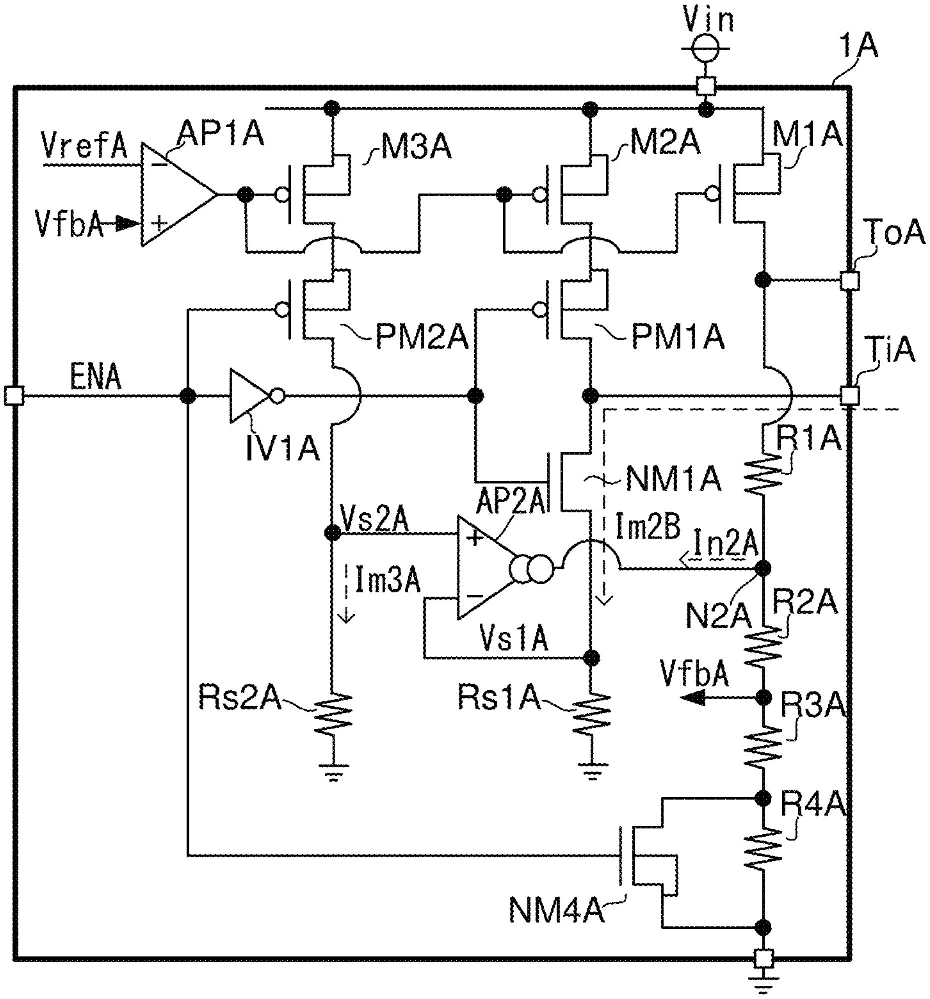
FIG. 7 is a diagram illustrating a structure of the linear power supply device according to a fourth embodiment.

FIG. 7 is a diagram illustrating a structure of the linear power supply device 1A according to the fourth embodiment. The structure illustrated in FIG. 7 is different from the first embodiment (FIG. 2) in that a circuit including an error amplifier AP2A is used instead of the current mirror circuit CMA, as a comparison unit that compares the mirror currents when being set to slave.

The linear power supply device 1A illustrated in FIG. 7 includes the error amplifier AP2A and sense resistors Rs1A and Rs2A. The source of the NMOS transistor NM1A is connected to a first terminal of the sense resistor Rs1A. A second terminal of the sense resistor Rs1A is connected to the ground terminal. The drain of the PMOS transistor PM2A is connected to a first terminal of the sense resistor Rs2A. A second terminal of the sense resistor Rs2A is connected to the ground terminal. An inverting input terminal (−) of the error amplifier AP2A is connected to the first terminal of the sense resistor Rs1A. A noninverting input terminal (+) of the error amplifier AP2A is connected to the first terminal of the sense resistor Rs2A. An output terminal of the error amplifier AP2A is connected to the node N2A.

If the linear power supply device 1A is set to slave, a mirror current Im2B (mirror current sent from the linear power supply device 1B), which flows from the outside through the current transmission/reception terminal TiA to the NMOS transistor NM1A, is converted into a voltage Vs1A by the sense resistor Rs1A. On the other hand, the mirror current Im3A that flows by the mirror transistor M3A through the PMOS transistor PM2A is converted into a voltage Vs2A by the sense resistor Rs2A. The error amplifier AP2A draws out or injects a current In2A from or into the node N2A, on the basis of a difference between the input voltages Vs1A and Vs2A. According to this embodiment, the output current IoutA can be controlled more accurately.

6. Fifth Embodiment

Figure 8:
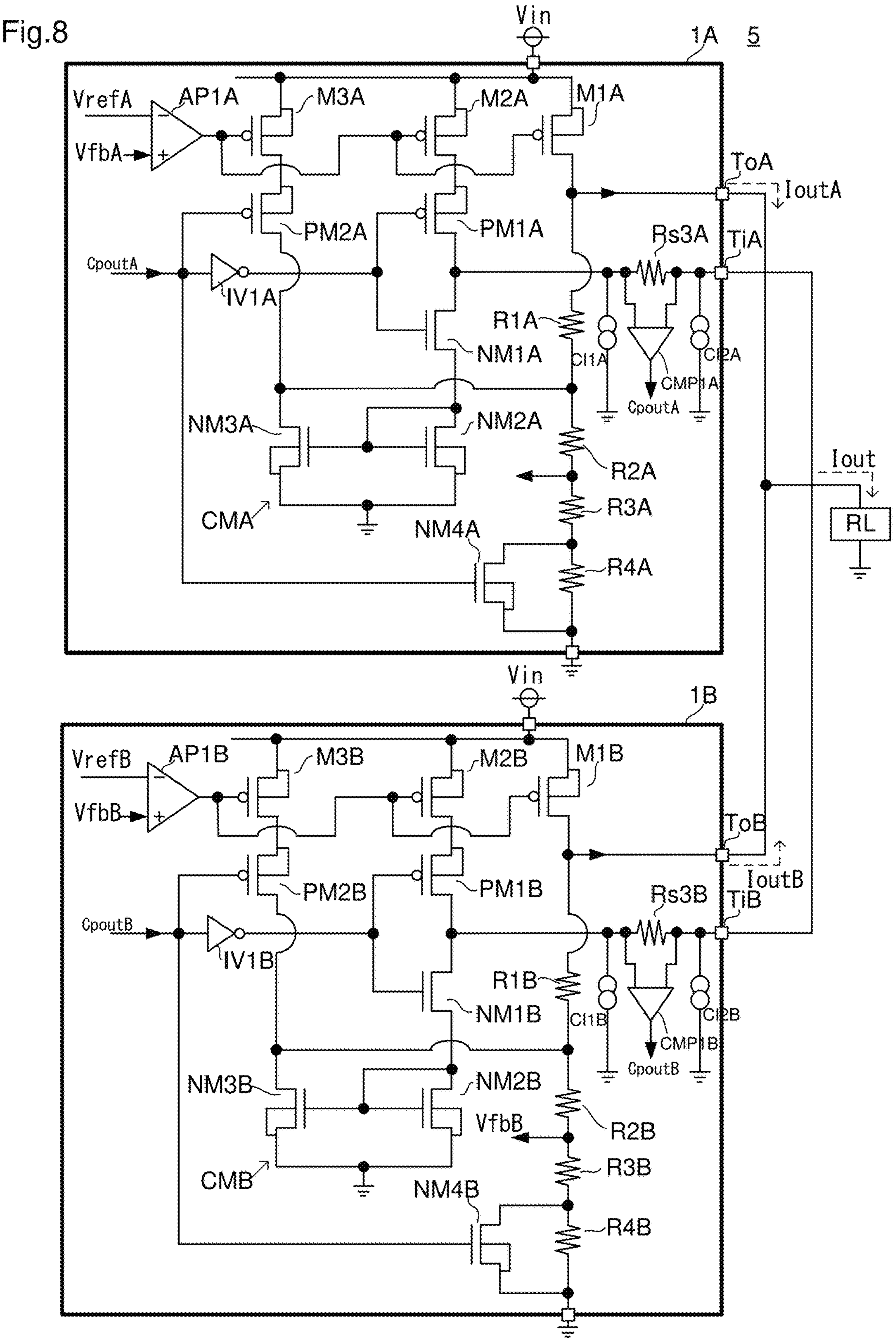
FIG. 8 is a diagram illustrating a structure of the power supply system according to a fifth embodiment.

FIG. 8 is a diagram illustrating a structure of the power supply system 5 according to the fifth embodiment. The structure illustrated in FIG. 8 is different from the first embodiment (FIG. 2) in that the linear power supply devices 1A and 1B are provided with sense resistors Rs3A and Rs3B, offset comparators CMP1A and CMP1B, constant current sources CI1A and CI1B, and constant current sources CI2A and CI2B.

Here, the linear power supply device 1A is typically described. A first terminal of the sense resistor Rs3A is connected to a node at which the PMOS transistor PM1A and the NMOS transistor NM1A are connected. A second terminal of the sense resistor Rs3A is connected to the current transmission/reception terminal TiA. A first input terminal of the offset comparator CMP1A is connected to the first terminal of the sense resistor Rs3A. A second input terminal of the offset comparator CMP1A is connected to the second terminal of the sense resistor Rs3A. The constant current source CI1A is connected to the first terminal of the sense resistor Rs3A. The constant current source CI2A is connected to the second terminal of the sense resistor Rs3A. A comparison signal CpoutA that is an output of the offset comparator CMP1A is input to the inverter IV1A.

With this structure, when the load current Iout is 0 A, and the output currents IoutA and IoutB are 0 A, current does not flow in the sense resistors Rs3A and Rs3B, and the comparison signals CpoutA and CpoutB output from the offset comparators CMP1A and CMP1B, respectively, are both high level. In this way, the linear power supply devices 1A and 1B are both set to master.

Then, the load current Iout starts to flow, and the mirror current flows to the outside from the current transmission/reception terminal TiA or TiB of the linear power supply device 1A or 1B of the output current IoutA or IoutB that flows first. In this case, the mirror current flows from the outside into the current transmission/reception terminal TiA or TiB of the linear power supply device 1A or 1B of the output current IoutA or IoutB that does not flow yet, and the mirror current flows in the sense resistor Rs3A or Rs3B in the linear power supply device 1A or 1B. In this way, the comparison signal CpoutA or CpoutB output from the offset comparator CMP1A or CMP1B in the linear power supply device 1A or 1B of the output current IoutA or IoutB, which does not flow yet, is switched to low level. Therefore, the linear power supply device 1A or 1B of the output current IoutA or IoutB that does not flow yet is set to slave.

Note that constant current values of the constant current sources CI2A and CI2B are set to N times (N>1) of constant current values of the constant current sources CI1A and CI2A, respectively. In this way, the comparison signal CpoutA or CpoutB is not switched to low level, unless certain amount of current flows into the current transmission/reception terminal TiA or TiB from the outside. Thus, when the load current Iout is not flowing, a malfunction that causes setting to slave can be suppressed.

Thus, in this embodiment, without providing an external terminal to input the enable signal ENA, ENB, it is possible to set to master or slave.

7. Sixth Embodiment

Figure 9:
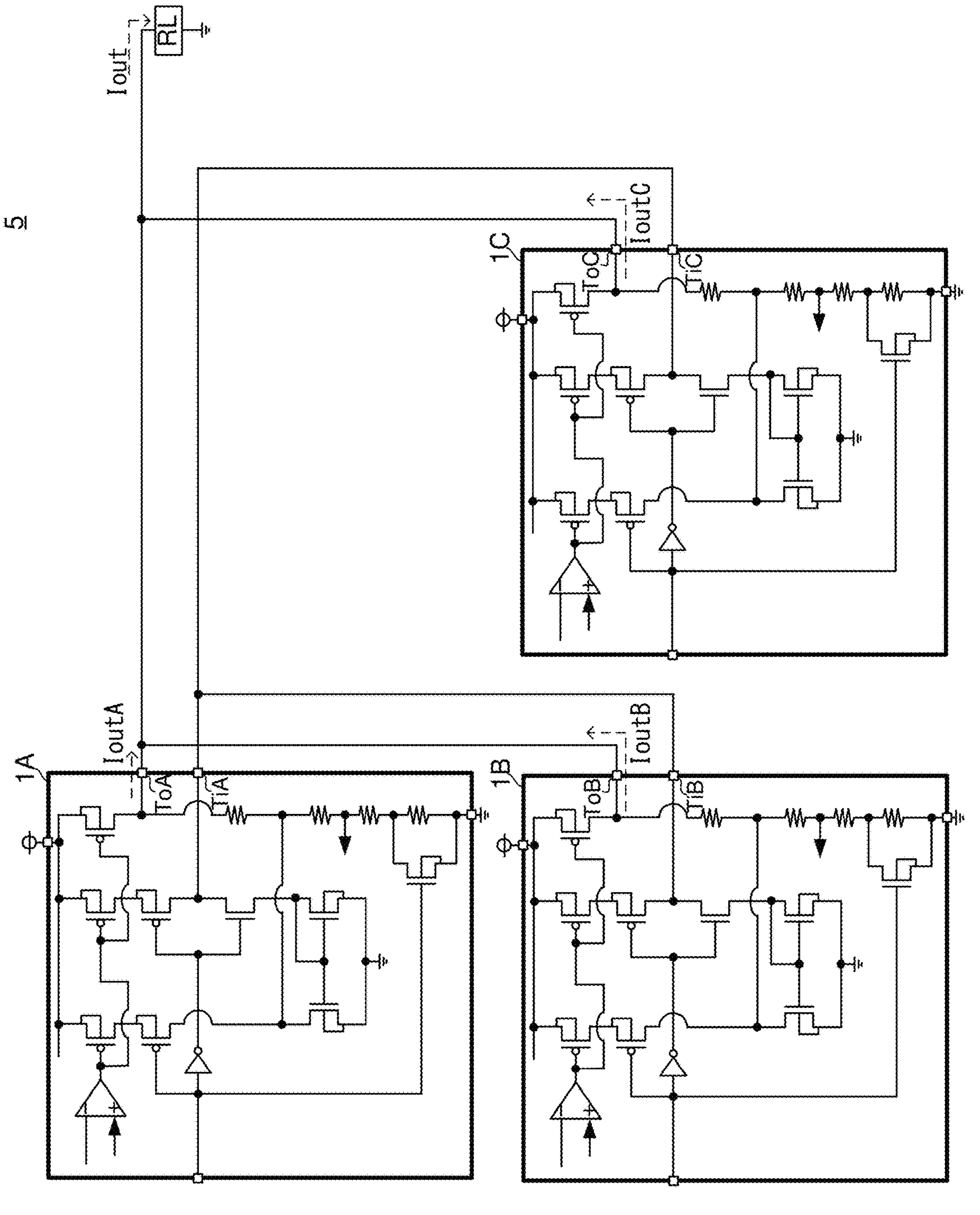
FIG. 9 is a diagram illustrating a structure of the power supply system according to a sixth embodiment.

FIG. 9 is a diagram illustrating a structure of the power supply system 5 according to the sixth embodiment. The power supply system 5 includes the linear power supply device 1A, the linear power supply device 1B, and a linear power supply device 1C. The power supply system 5 uses three linear power supply devices 1A, 1B, and 1C so as to supply the load current Iout to the load RL.

The linear power supply devices 1A, 1B, and 1C each have the same circuit structure as that of the linear power supply devices 1A and 1B of the first embodiment (FIG. 2) described above. When using the power supply system 5, the linear power supply device 1A is set to master, and the linear power supply devices 1B and 1C are set to slave.

The output terminals ToB and ToC of the linear power supply devices 1B and 1C are commonly connected to the output terminal ToA of the linear power supply device 1A. The current transmission/reception terminals TiB and TiC of the linear power supply devices 1B and 1C are commonly connected to the current transmission/reception terminal TiA of the linear power supply device 1A.

Figure 10:
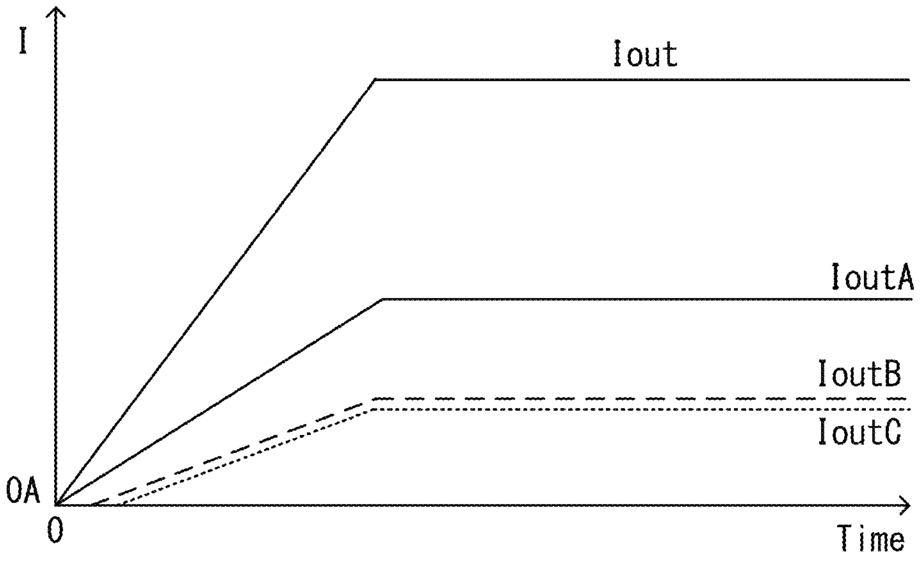
FIG. 10 is a diagram illustrating a waveform example of the output current and the load current in the power supply system according to the sixth embodiment.

FIG. 10 is a diagram illustrating a waveform example of the output currents IoutA, IoutB, and IoutC, and the load current Iout of the power supply system 5 according to this embodiment. As illustrated in FIG. 10, when the load current Iout starts to flow from 0 A, initially, the output currents IoutB and IoutC are not output from the output terminals ToB and ToC of the linear power supply devices 1B and 1C, which are set to slave, and only the output current IoutA output from the output terminal ToA of the linear power supply device 1A, which is set to master, supplies the load current Iout. After that, the output currents IoutB and IoutC rises, and parallel operation of the linear power supply devices 1A, 1B, and 1C is performed. In this case, the output current IoutA is controlled to be approximately ½ of the load current Iout, and the output currents IoutB and IoutC are controlled to be each approximately ½ of the output current IoutA.

In this way, heat is dispersed among the linear power supply devices 1A, 1B, and 1C, and it is possible to use a large package having a high heat radiation characteristic for the linear power supply device 1A, and to use a small package having a low heat radiation characteristic for the linear power supply devices 1B and 1C. Therefore, a circuit scale of the power supply system 5 can be reduced.

Note that it may be possible that three or more linear power supply devices that are set to slave are connected to one linear power supply device that is set to master. In addition, it may also be possible to apply a linear power supply device having a structure of another embodiment than the first embodiment to this embodiment.

8. Others

Note that various technical features according to the present disclosure may be variously modified other than the embodiment described above, within the scope of the technical creation without deviating from the spirit thereof. In other words, the above embodiments are merely examples in every aspect and should not be interpreted as limitations, and the technical scope of the present disclosure is not limited to the embodiments described above, but should be understood to include all modifications within meaning and scope equivalent to the claims. In addition, the embodiments described above may be appropriately combined for implementation as long as no contradiction arises.

9. Additional Remarks

As described above, for example, a linear power supply device (1A) according to the present disclosure comprises:

an output transistor (M1A) including a first terminal configured to be capable of connecting to an application terminal of an input voltage (Vin), and a second terminal configured to be capable of connecting to a first feedback resistor among the first feedback resistor (R1A), a second feedback resistor (R2A), and a third feedback resistor (R3A), which are connected in series;

a first error amplifier (AP1A) to which a reference voltage (VrefA) and a feedback voltage (VfbA) generated at a first node, at which the second feedback resistor and the third feedback resistor are connected, are input, the first error amplifier being configured to be capable of controlling a control terminal of the output transistor;

an output terminal (ToA) connected to a second terminal of the output transistor; a current transmission/reception terminal (TiA);

a first mirror transistor (M2A) configured to capable of generating a first mirror current (Im2A) of a current flowing in the output transistor;

a second mirror transistor (M3A) configured to capable of generating a second mirror current (Im3A) of the current flowing in the output transistor;

a switch circuit (SWA) configured to switch between outputting the first mirror current from the current transmission/reception terminal to the outside, and receiving an external mirror current from the outside through the current transmission/reception terminal, on the basis of a switching signal (ENA); and a comparison unit (CMA) configured to compare the external mirror current with the second mirror current, so as to draw out current from a second node (N2A), at which the first feedback resistor and the second feedback resistor are connected, or to inject current into the second node, on the basis of the comparison result (first structure, FIG. 2).

In addition, in the first structure described above, it may be possible to adopt a structure (second structure, FIG. 2), which includes a fourth feedback resistor (R4A) configured to be capable of connecting to the third feedback resistor (R3A), and a bypass switch (NM4A) configured to switch whether or not to bypass the fourth feedback resistor on the basis of the switching signal (ENA).

In addition, in the first structure described above, it may be possible to adopt a structure (third structure, FIG. 5), which includes the third feedback resistor (R3A) and a terminal for resistor (TrA), and in which the terminal for resistor is capable of connecting to a fourth feedback resistor (R4A) or to the ground terminal.

In addition, in any one of the first to third structures, it may be possible to adopt a structure (fourth structure, FIG. 2), which includes an external terminal (TeA) configured to be capable of receiving the switching signal (ENA).

In addition, in any one of the first to fourth structures, it may be possible to adopt a structure (fifth structure, FIG. 2), in which the first mirror transistor (M2A) and the second mirror transistor (M3A) are separate ones.

In addition, in any one of the first to fourth structures, it may be possible to adopt a structure (sixth structure, FIG. 6), in which the first mirror transistor and the second mirror transistor are the same transistor (M2A).

In addition, in any one of the first to sixth structures, it may be possible to adopt a structure (seventh structure, FIG. 2), in which the switch circuit includes:

a PMOS transistor (PM1A) having a source connected to the first mirror transistor (M2A), and a gate that is driven based on the switching signal (ENA); and a NMOS transistor (NM1A) having a drain connected to a drain of the PMOS transistor, a gate that is driven based on the switching signal, and a source connected to the comparison unit (CMA).

In addition, in any one of the first to seventh structures, it may be possible to adopt a structure (eighth structure, FIG. 2), in which the comparison unit is a current mirror circuit (CMA) configured to mirror and output the external mirror current input.

In addition, in any one of the first to seventh structures, it may be possible to adopt a structure (ninth structure, FIG. 7), in which the comparison unit includes:

a first sense resistor (Rs1A) configured to perform current-voltage conversion from the external mirror current to a first voltage (Vs1A);

a second sense resistor (Rs2A) configured to perform current-voltage conversion from the second mirror current (Im3A) to a second voltage (Vs2A); and a second error amplifier (AP2A) configured to drawn out current from the second node (N2A), or to inject current into the second node, on the basis of a difference between the first voltage and the second voltage.

In addition, in any one of the first to ninth structures, it may be possible to adopt a structure (tenth structure, FIG. 8), which includes a sense resistor (Rs3A) having a first terminal connected to the switch circuit (SWA), and a second terminal connected to the current transmission/reception terminal (TiA); an offset comparator (CMP1A) having input terminals connected to both ends of the sense resistor, the offset comparator being configured to be capable of outputting the switching signal (CpoutA); a first constant current source (CI1A) connected to a first terminal of the sense resistor; and a second constant current source (CI2A) connected to a second terminal of the sense resistor, in which a constant current value of the second constant current source is natural number times of a constant current value of the first constant current source, the natural number being larger than one.

In addition, a power supply system (5) according to the present disclosure includes two linear power supply devices (1A and 1B) having any one of the first to tenth structures, in which the output terminals (ToA and ToB) of the two linear power supply devices are capable of commonly connecting to a load (RL), and the current transmission/reception terminals (TiA and TiB) of the two linear power supply devices are capable of connecting to each other (eleventh structure).

In addition, a power supply system (5) according to the present disclosure includes: one master linear power supply device (1A) as the linear power supply device having any one of first to tenth structures, which is set to master so as to output the first mirror current from the current transmission/reception terminal to the outside; and two or more slave linear power supply devices (1B and 1C) as the linear power supply devices having any one of first to tenth structures, which are set to slave so as to receive the external mirror current from the outside through the current transmission/reception terminal, in which the output terminals (ToB and ToC) of the two or more slave linear power supply devices are commonly connected to the output terminal (ToA) of the master linear power supply device, and the current transmission/reception terminals (TiB and TiC) of the two or more slave linear power supply devices are commonly connected to the current transmission/reception terminal (TiA) of the master linear power supply device (twelfth structure, FIG. 9).

INDUSTRIAL APPLICABILITY

The present disclosure can be applied to a power supply system that is mounted in various equipment.

LIST OF REFERENCE SIGNS

1A, 1B, 1C linear power supply device
5 power supply system
M1A, M1B output transistor
M2A, M2B mirror transistor
M3A, M3B mirror transistor
PM1A, PM1B PMOS transistor
PM2A, PM2B PMOS transistor
NM1A, NM1B NMOS transistor
NM2A, NM2B NMOS transistor
NM3A, NM3B NMOS transistor
NM4A, NM4B NMOS transistor
IV1A, IV1B inverter
AP1A, AP1B error amplifier
R1A, R2A, R3A, R4A feedback resistor
R1B, R2B, R3B, R4B feedback resistor
ToA, ToB output terminal
TiA, TiB current transmission/reception terminal
TeA, TeB enable terminal
TrA terminal for resistor
Rs1A, Rs2A sense resistor
AP2A error amplifier
Rs3A, Rs3B sense resistor
CMP1A, CMP1B offset comparator
CI1A, CI1B constant current source
CI2A, CI2B constant current source
RL load

The invention claimed is:

1. A linear power supply device comprising:

an output transistor including a first terminal configured to be capable of connecting to an application terminal of an input voltage, and a second terminal configured to be capable of connecting to a first feedback resistor among the first feedback resistor, a second feedback resistor, and a third feedback resistor, which are connected in series;

a first error amplifier to which a reference voltage and a feedback voltage generated at a first node, at which the second feedback resistor and the third feedback resistor are connected, are input, the first error amplifier being configured to be capable of controlling a control terminal of the output transistor;

an output terminal connected to a second terminal of the output transistor;

a current transmission/reception terminal;

a first mirror transistor configured to capable of generating a first mirror current of a current flowing in the output transistor;

a second mirror transistor configured to capable of generating a second mirror current of the current flowing in the output transistor;

a switch circuit configured to switch between outputting the first mirror current from the current transmission/reception terminal to the outside, and receiving an external mirror current from the outside through the current transmission/reception terminal, on the basis of a switching signal; and a comparison unit configured to compare the external mirror current with the second mirror current, so as to draw out current from a second node, at which the first feedback resistor and the second feedback resistor are connected, or to inject current into the second node, on the basis of the comparison result.

2. The linear power supply device according to claim 1, comprising:

a fourth feedback resistor configured to be capable of connecting to the third feedback resistor; and a bypass switch configured to switch whether or not to bypass the fourth feedback resistor on the basis of the switching signal.

3. The linear power supply device according to claim 1, comprising the third feedback resistor and a terminal for resistor, wherein the terminal for resistor is capable of connecting to a fourth feedback resistor or to a ground terminal.

4. The linear power supply device according to claim 1, comprising an external terminal configured to be capable of receiving the switching signal.

5. The linear power supply device according to claim 1, wherein the first mirror transistor and the second mirror transistor are separate ones.

6. The linear power supply device according to claim 1, wherein the first mirror transistor and the second mirror transistor are the same transistor.

7. The linear power supply device according to claim 1, wherein the switch circuit includes:

a PMOS transistor having a source connected to the first mirror transistor, and a gate that is driven based on the switching signal; and an NMOS transistor having a drain connected to a drain of the PMOS transistor, a gate that is driven based on the switching signal, and a source connected to the comparison unit.

8. The linear power supply device according to claim 1, wherein the comparison unit is a current mirror circuit configured to mirror and output the external mirror current input.

9. The linear power supply device according to claim 1, wherein the comparison unit includes:

a first sense resistor configured to perform current-voltage conversion from the external mirror current to a first voltage;

a second sense resistor configured to perform current-voltage conversion from the second mirror current to a second voltage; and a second error amplifier configured to drawn out current from the second node or to inject current into the second node, on the basis of a difference between the first voltage and the second voltage.

10. The linear power supply device according to claim 1, comprising:

a sense resistor having a first terminal connected to the switch circuit, and a second terminal connected to the current transmission/reception terminal;

an offset comparator having input terminals connected to both ends of the sense resistor, the offset comparator being configured to be capable of outputting the switching signal;

a first constant current source connected to a first terminal of the sense resistor; and a second constant current source connected to a second terminal of the sense resistor, wherein a constant current value of the second constant current source is natural number times of a constant current value of the first constant current source, the natural number being larger than one.

11. A power supply system comprising two said linear power supply devices according to claim 1, wherein the output terminals of the two linear power supply devices are capable of commonly connecting to a load, and the current transmission/reception terminals of the two linear power supply devices are capable of connecting to each other.

12. A power supply system comprising:

one master linear power supply device as the linear power supply device according to claim 1, which is set to master so as to output the first mirror current from the current transmission/reception terminal to the outside; and two or more slave linear power supply devices as the linear power supply devices according to claim 1, which are set to slave so as to receive the external mirror current from the outside through the current transmission/reception terminal, wherein the output terminals of the two or more slave linear power supply devices are commonly connected to the output terminal of the master linear power supply device, and the current transmission/reception terminals of the two or more slave linear power supply devices are commonly connected to the current transmission/reception terminal of the master linear power supply device.

* * * * *